United States Patent
Leddy, III et al.

(10) Patent No.: US 12,002,102 B2
(45) Date of Patent: Jun. 4, 2024

(54) SYSTEM, METHOD, AND COMPUTER PROGRAM PRODUCT FOR PATIENT AUTHENTICATION AND IDENTITY RISK ASSESSMENT

(71) Applicant: Visa International Service Association, San Francisco, CA (US)

(72) Inventors: William Joseph Leddy, III, Lakeway, TX (US); Shengfei Gu, Austin, TX (US); Minghua Xu, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 579 days.

(21) Appl. No.: 17/197,806

(22) Filed: Mar. 10, 2021

(65) Prior Publication Data
US 2021/0304316 A1   Sep. 30, 2021

Related U.S. Application Data

(60) Provisional application No. 62/993,909, filed on Mar. 24, 2020.

(51) Int. Cl.
*G06Q 40/08* (2012.01)
*G06F 21/31* (2013.01)
(Continued)

(52) U.S. Cl.
CPC ............. *G06Q 40/08* (2013.01); *G06F 21/31* (2013.01); *G06F 21/32* (2013.01); *G06F 21/33* (2013.01);
(Continued)

(58) Field of Classification Search
CPC ......... G06Q 40/08; G06F 21/31; G06F 21/32; G06F 21/33; G06F 21/43; G06F 21/6245; H04W 12/126
See application file for complete search history.

(56) References Cited

U.S. PATENT DOCUMENTS

2003/0065626 A1   4/2003   Allen
2014/0007179 A1*  1/2014   Moore ................... H04L 63/10
                                                 726/1
(Continued)

OTHER PUBLICATIONS

"Visa AuthorizeFirst Healthcare Transaction Guidelines: Tools and Best Practices for Processing Pre-authorized Healthcare Transactions", 2008, p. 1-36, Visa, available at https://usa.visa.com/dam/VCOM/download/merchants/authorize-first-healthcare-transaction-guidelines.pdf.

*Primary Examiner* — Quazi Farooqui
(74) *Attorney, Agent, or Firm* — The Webb Law Firm

(57) ABSTRACT

Provided are a system, method, and computer program product for patient authentication and identity risk assessment. The method includes receiving an initial patient authorization request from a medical provider computing device. The initial patient authorization request includes a patient identifier communicated by a mobile device of a user to the medical provider computing device. The method also includes generating, using an identification risk assessment model and based at least partly on the initial patient authorization request, an authenticity score. The method further includes communicating the authenticity score to an insurance provider system to cause the insurance provider system to approve or decline the initial patient authorization request. The method further includes receiving a primary insurance provider response from the insurance provider system and communicating at least a portion of the primary insurance provider response to the medical provider computing device.

16 Claims, 10 Drawing Sheets

(51) Int. Cl.
*G06F 21/32* (2013.01)
*G06F 21/33* (2013.01)
*G06F 21/43* (2013.01)
*G06F 21/62* (2013.01)
*H04W 12/126* (2021.01)

(52) U.S. Cl.
CPC .......... *G06F 21/43* (2013.01); *G06F 21/6245* (2013.01); *H04W 12/126* (2021.01)

(56) References Cited

U.S. PATENT DOCUMENTS

| | | | |
|---|---|---|---|
| 2016/0342752 A1* | 11/2016 | Stueckemann | G06Q 10/10 |
| 2018/0189447 A1* | 7/2018 | Khatri | G16H 40/63 |
| 2019/0080325 A1 | 3/2019 | Pourfallah et al. | |

* cited by examiner

SYSTEM, METHOD, AND COMPUTER PROGRAM PRODUCT FOR PATIENT AUTHENTICATION AND IDENTITY RISK ASSESSMENT

CROSS REFERENCE TO RELATED APPLICATION

This application claims priority to U.S. Provisional Patent Application No. 62/993,909, filed Mar. 24, 2020, titled "System, Method, and Computer Program Product for Patient Authentication and Identity Risk Assessment," the disclosure of which is hereby incorporated by reference in its entirety.

BACKGROUND

1. Field

This disclosure relates generally to authentication networks and, in some non-limiting embodiments or aspects, to a system, method, and computer program product for facilitating patient authentication using identity risk assessment techniques.

2. Technical Considerations

Patient authentication at healthcare (e.g., medical) providers can be weak, insecure, and a target for identity thieves. A patient can present insurance information belonging to another person to a medical provider and receive care under the guise of being the insured person. Many forms of patient authentication presented in-person at a medical provider are subjectively reviewed by medical personnel and may be forged.

There is a need in the art for a technical solution to provide more secure patient authentication systems while also eliminating opportunities for nefarious actors to assume the identity of another insured person when seeking medical care.

SUMMARY

Accordingly, it is an object of the presently disclosed subject matter to provide systems, methods, and computer program products for patient authentication and identity risk assessment. Preferably, the method includes receiving an initial patient authorization request from a medical provider computing device. Preferably, the method includes generating, using an identification risk assessment model and based at least partly on the initial patient authorization request, an authenticity score. Preferably, the method includes communicating the authenticity score to an insurance provider system to cause the insurance provider system to approve or decline the initial patient authorization request. Preferably, the method further includes receiving a primary insurance provider response from the insurance provider system and communicating at least a portion of the primary insurance provider response to the medical provider computing device.

According to some non-limiting embodiments or aspects, provided is a computer-implemented method for patient authentication and identity risk assessment. The method includes receiving, with at least one processor, an initial patient authorization request from a medical provider computing device. The initial patient authorization request includes a patient identifier communicated by a mobile device of a user to the medical provider computing device. The method also includes generating, with at least one processor using an identification risk assessment model and based at least partly on the initial patient authorization request, an authenticity score. The method further includes communicating, with at least one processor, the authenticity score to an insurance provider system to cause the insurance provider system to approve or decline the initial patient authorization request. The method further includes receiving, with at least one processor, a primary insurance provider response from the insurance provider system. The method further includes communicating, with at least one processor, at least a portion of the primary insurance provider response to the medical provider computing device.

In some non-limiting embodiments or aspects, the primary insurance provider response may include a final authorization of insurance for a patient associated with the patient identifier.

In some non-limiting embodiments or aspects, the primary insurance provider response may include a prompt for the mobile device to initiate a patient identification response to prove patient identity. The method may also include receiving, with at least one processor, the patient identification response from the mobile device. The patient identification response may include the patient identifier and at least one proof including at least one of the following: biometric data captured by the mobile device; a patient identity token stored on the mobile device; patient credentials input by the user on the mobile device; or any combination thereof.

In some non-limiting embodiments or aspects, the method may further include, in response to the at least one proof including an invalid proof, communicating, with at least one processor, an identification evaluation response to the mobile device comprising a failure message. The method may further include, in response to the at least one proof including an invalid proof, initiating, with at least one processor, at least one insurance security action. The at least one insurance security action may include at least one of the following: freezing an insurance account associated with the patient identifier; communicating an alert to a registered computing device associated with the patient identifier; communicating an alert to the medical provider computing device; or any combination thereof.

In some non-limiting embodiments or aspects, the method may further include, in response to validating the at least one proof, communicating, with at least one processor, an identification evaluation response to the mobile device including a validation token. The method may further include receiving, with at least one processor, a secondary patient authorization request from the medical provider computing device via an electronic payment processing network. The secondary patient authorization request may include the patient identifier and the validation token communicated by the mobile device to the medical provider computing device. The method may further include generating, with at least one processor using the identification risk assessment model and based at least partly on the secondary patient authorization request, a new authenticity score. The method may further include communicating, with at least one processor, the new authenticity score to the insurance provider system to cause the insurance provider system to approve or decline the secondary patient authorization request. The method may further include receiving, with at least one processor, a secondary insurance provider response from the insurance provider system. The method may further include communicating, with at least one processor, at least a portion of the secondary insurance provider response to the medical provider computing device.

In some non-limiting embodiments or aspects, the secondary insurance provider response may include a final authorization of insurance for a patient associated with the patient identifier.

According to some non-limiting embodiments or aspects, provided is a system for patient authentication and identity risk assessment including a server including at least one processor. The server is programmed and/or configured to receive an initial patient authorization request from a medical provider computing device. The initial patient authorization request includes a patient identifier communicated by a mobile device of a user to the medical provider computing device. The server is programmed and/or configured to generate, using an identification risk assessment model and based at least partly on the initial patient authorization request, an authenticity score. The server is programmed and/or configured to communicate the authenticity score to an insurance provider system to cause the insurance provider system to approve or decline the initial patient authorization request. The server is programmed and/or configured to receive a primary insurance provider response from the insurance provider system. The server is programmed and/or configured to communicate at least a portion of the primary insurance provider response to the medical provider computing device.

In some non-limiting embodiments or aspects, the primary insurance provider response may include a prompt for the mobile device to initiate a patient identification response to prove patient identity. The server may be further programmed and/or configured to receive the patient identification response from the mobile device. The patient identification response may include the patient identifier and at least one proof including at least one of the following: biometric data captured by the mobile device; a patient identity token stored on the mobile device; patient credentials input by the user on the mobile device; or any combination thereof.

In some non-limiting embodiments or aspects, the server may be further programmed and/or configured to, in response to the at least one proof including an invalid proof, communicate an identification evaluation response to the mobile device including a failure message. The server may be further programmed and/or configured to, in response to the at least one proof including an invalid proof, initiate at least one insurance security action. The at least one insurance security action may include at least one of the following: freezing an insurance account associated with the patient identifier; communicating an alert to a registered computing device associated with the patient identifier; communicating an alert to the medical provider computing device; or any combination thereof.

In some non-limiting embodiments or aspects, the server may be further programmed and/or configured to, in response to validating the at least one proof, communicate an identification evaluation response to the mobile device including a validation token. The server may be further programmed and/or configured to receive a secondary patient authorization request from the medical provider computing device via the electronic payment processing network. The secondary patient authorization request may include the patient identifier and the validation token communicated by the mobile device to the medical provider computing device. The server may be further programmed and/or configured to generate, using the identification risk assessment model and based at least partly on the secondary patient authorization request, a new authenticity score. The server may be further programmed and/or configured to communicate the new authenticity score to the insurance provider system to cause the insurance provider system to approve or decline the secondary patient authorization request. The server may be further programmed and/or configured to receive a secondary insurance provider response from the insurance provider system. The server may be further programmed and/or configured to communicate at least a portion of the secondary insurance provider response to the medical provider computing device.

In some non-limiting embodiments or aspects, the secondary insurance provider response may include a final authorization of insurance for a patient associated with the patient identifier.

According to some non-limiting embodiments or aspects, provided is a computer program product patient authentication and identity risk assessment. The computer program product includes at least one non-transitory computer-readable medium including program instructions that, when executed by at least one processor, cause the at least one processor to receive an initial patient authorization request from a medical provider computing device. The initial patient authorization request includes a patient identifier communicated by a mobile device of a user to the medical provider computing device. The program instructions cause the at least one processor to generate, using an identification risk assessment model and based at least partly on the initial patient authorization request, an authenticity score. The program instructions cause the at least one processor to communicate the authenticity score to an insurance provider system to cause the insurance provider system to approve or decline the initial patient authorization request. The program instructions cause the at least one processor to receive a primary insurance provider response from the insurance provider system. The program instructions cause the at least one processor to communicate at least a portion of the primary insurance provider response to the medical provider computing device.

In some non-limiting embodiments or aspects, the primary insurance provider response may include a prompt for the mobile device to initiate a patient identification response to prove patient identity. The program instructions may further cause the at least one processor to receive the patient identification response from the mobile device. The patient identification response may include the patient identifier and at least one proof including at least one of the following: biometric data captured by the mobile device; a patient identity token stored on the mobile device; patient credentials input by the user on the mobile device; or any combination thereof.

In some non-limiting embodiments or aspects, the program instructions may further cause the at least one processor to, in response to the at least one proof including an invalid proof, communicate an identification evaluation response to the mobile device comprising a failure message. The program instructions may further cause the at least one processor to, in response to the at least one proof including an invalid proof, initiate at least one insurance security action. The at least one insurance security action may include at least one of the following: freezing an insurance account associated with the patient identifier; communicating an alert to a registered computing device associated with the patient identifier; communicating an alert to the medical provider computing device; or any combination thereof.

In some non-limiting embodiments or aspects, the program instructions may further cause the at least one processor to, in response to validating the at least one proof, communicate an identification evaluation response to the mobile device comprising a validation token. The program instructions may further cause the at least one processor to receive a secondary patient authorization request from the medical provider computing device via an electronic payment processing network. The secondary patient authorization request may include the patient identifier and the validation token communicated by the mobile device to the medical provider computing device. The program instructions may further cause the at least one processor to generate, using the identification risk assessment model and based at least partly on the secondary patient authorization request, a new authenticity score. The program instructions may further cause the at least one processor to communicate the new authenticity score to the insurance provider system to cause the insurance provider system to approve or decline the secondary patient authorization request. The program instructions may further cause the at least one processor to receive a secondary insurance provider response from the insurance provider system. The program instructions may further cause the at least one processor to communicate at least a portion of the secondary insurance provider response to the medical provider computing device.

In some non-limiting embodiments or aspects, the secondary insurance provider response may include a final authorization of insurance for a patient associated with the patient identifier.

Further embodiments or aspects are set forth in the following numbered clauses:

Clause 1: A computer-implemented method comprising: receiving, with at least one processor, an initial patient authorization request from a medical provider computing device, the initial patient authorization request comprising a patient identifier communicated by a mobile device of a user to the medical provider computing device; generating, with at least one processor using an identification risk assessment model and based at least partly on the initial patient authorization request, an authenticity score; communicating, with at least one processor, the authenticity score to an insurance provider system to cause the insurance provider system to approve or decline the initial patient authorization request; receiving, with at least one processor, a primary insurance provider response from the insurance provider system; and communicating, with at least one processor, at least a portion of the primary insurance provider response to the medical provider computing device.

Clause 2: The computer-implemented method of clause 1, wherein the primary insurance provider response comprises a final authorization of insurance for a patient associated with the patient identifier.

Clause 3: The computer-implemented method of clause 1 or 2, wherein the primary insurance provider response comprises a prompt for the mobile device to initiate a patient identification response to prove patient identity.

Clause 4: The computer-implemented method of any of clauses 1-3, further comprising receiving, with at least one processor, the patient identification response from the mobile device, the patient identification response comprising the patient identifier and at least one proof comprising at least one of the following: biometric data captured by the mobile device; a patient identity token stored on the mobile device; patient credentials input by the user on the mobile device; or any combination thereof.

Clause 5: The computer-implemented method of any of clauses 1-4, further comprising, in response to the at least one proof comprising an invalid proof: communicating, with at least one processor, an identification evaluation response to the mobile device comprising a failure message; and initiating, with at least one processor, at least one insurance security action comprising at least one of the following: freezing an insurance account associated with the patient identifier; communicating an alert to a registered computing device associated with the patient identifier; communicating an alert to the medical provider computing device; or any combination thereof.

Clause 6: The computer-implemented method of any of clauses 1-5, further comprising, in response to validating the at least one proof, communicating, with at least one processor, an identification evaluation response to the mobile device comprising a validation token.

Clause 7: The computer-implemented method of any of clauses 1-6, further comprising: receiving, with at least one processor, a secondary patient authorization request from the medical provider computing device via an electronic payment processing network, the secondary patient authorization request comprising the patient identifier and the validation token communicated by the mobile device to the medical provider computing device; generating, with at least one processor using the identification risk assessment model and based at least partly on the secondary patient authorization request, a new authenticity score; communicating, with at least one processor, the new authenticity score to the insurance provider system to cause the insurance provider system to approve or decline the secondary patient authorization request; receiving, with at least one processor, a secondary insurance provider response from the insurance provider system; and communicating, with at least one processor, at least a portion of the secondary insurance provider response to the medical provider computing device.

Clause 8: The computer-implemented method of any of clauses 1-7, wherein the secondary insurance provider response comprises a final authorization of insurance for a patient associated with the patient identifier.

Clause 9: A system comprising a server comprising at least one processor, the server being programmed and/or configured to: receive an initial patient authorization request from a medical provider computing device, the initial patient authorization request comprising a patient identifier communicated by a mobile device of a user to the medical provider computing device; generate, using an identification risk assessment model and based at least partly on the initial patient authorization request, an authenticity score; communicate the authenticity score to an insurance provider system to cause the insurance provider system to approve or decline the initial patient authorization request; receive a primary insurance provider response from the insurance provider system; and communicate at least a portion of the primary insurance provider response to the medical provider computing device.

Clause 10: The system of clause 9, wherein the primary insurance provider response comprises a prompt for the mobile device to initiate a patient identification response to prove patient identity.

Clause 11: The system of clause 9 or 10, wherein the server is further programmed and/or configured to receive the patient identification response from the mobile device, the patient identification response comprising the patient identifier and at least one proof comprising at least one of the following: biometric data captured by the mobile device; a patient identity token stored on the mobile device; patient credentials input by the user on the mobile device; or any combination thereof.

Clause 12: The system of any of clauses 9-11, wherein the server is further programmed and/or configured to, in response to the at least one proof comprising an invalid proof: communicate an identification evaluation response to the mobile device comprising a failure message; and initiate at least one insurance security action comprising at least one of the following: freezing an insurance account associated with the patient identifier; communicating an alert to a registered computing device associated with the patient identifier; communicating an alert to the medical provider computing device; or any combination thereof.

Clause 13: The system of any of clauses 9-12, wherein the server is further programmed and/or configured to: in response to validating the at least one proof, communicate an identification evaluation response to the mobile device comprising a validation token; receive a secondary patient authorization request from the medical provider computing device via an electronic payment processing network, the secondary patient authorization request comprising the patient identifier and the validation token communicated by the mobile device to the medical provider computing device; generate, using the identification risk assessment model and based at least partly on the secondary patient authorization request, a new authenticity score; communicate the new authenticity score to the insurance provider system to cause the insurance provider system to approve or decline the secondary patient authorization request; receive a secondary insurance provider response from the insurance provider system; and communicate at least a portion of the secondary insurance provider response to the medical provider computing device.

Clause 14: The system of any of clauses 9-13, wherein the secondary insurance provider response comprises a final authorization of insurance for a patient associated with the patient identifier.

Clause 15: A computer program product comprising at least one non-transitory computer-readable medium including program instructions that, when executed by at least one processor, cause the at least one processor to: receive an initial patient authorization request from a medical provider computing device, the initial patient authorization request comprising a patient identifier communicated by a mobile device of a user to the medical provider computing device; generate, using an identification risk assessment model and based at least partly on the initial patient authorization request, an authenticity score; communicate the authenticity score to an insurance provider system to cause the insurance provider system to approve or decline the initial patient authorization request; receive a primary insurance provider response from the insurance provider system; and communicate at least a portion of the primary insurance provider response to the medical provider computing device.

Clause 16: The computer program product of clause 15, wherein the primary insurance provider response comprises a prompt for the mobile device to initiate a patient identification response to prove patient identity.

Clause 17: The computer program product of clause 15 or 16, wherein the program instructions further cause the at least one processor to receive the patient identification response from the mobile device, the patient identification response comprising the patient identifier and at least one proof comprising at least one of the following: biometric data captured by the mobile device; a patient identity token stored on the mobile device; patient credentials input by the user on the mobile device; or any combination thereof.

Clause 18: The computer program product of any of clauses 15-17, wherein the program instructions further cause the at least one processor to, in response to the at least one proof comprising an invalid proof: communicate an identification evaluation response to the mobile device comprising a failure message; and initiate at least one insurance security action comprising at least one of the following: freezing an insurance account associated with the patient identifier; communicating an alert to a registered computing device associated with the patient identifier; communicating an alert to the medical provider computing device; or any combination thereof.

Clause 19: The computer program product of any of clauses 15-18, wherein the program instructions further cause the at least one processor to: in response to validating the at least one proof, communicate an identification evaluation response to the mobile device comprising a validation token; receive a secondary patient authorization request from the medical provider computing device via an electronic payment processing network, the secondary patient authorization request comprising the patient identifier and the validation token communicated by the mobile device to the medical provider computing device; generate, using the identification risk assessment model and based at least partly on the secondary patient authorization request, a new authenticity score; communicate the new authenticity score to the insurance provider system to cause the insurance provider system to approve or decline the secondary patient authorization request; receive a secondary insurance provider response from the insurance provider system; and communicate at least a portion of the secondary insurance provider response to the medical provider computing device.

Clause 20: The computer program product of any of clauses 15-19, wherein the secondary insurance provider response comprises a final authorization of insurance for a patient associated with the patient identifier.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1:
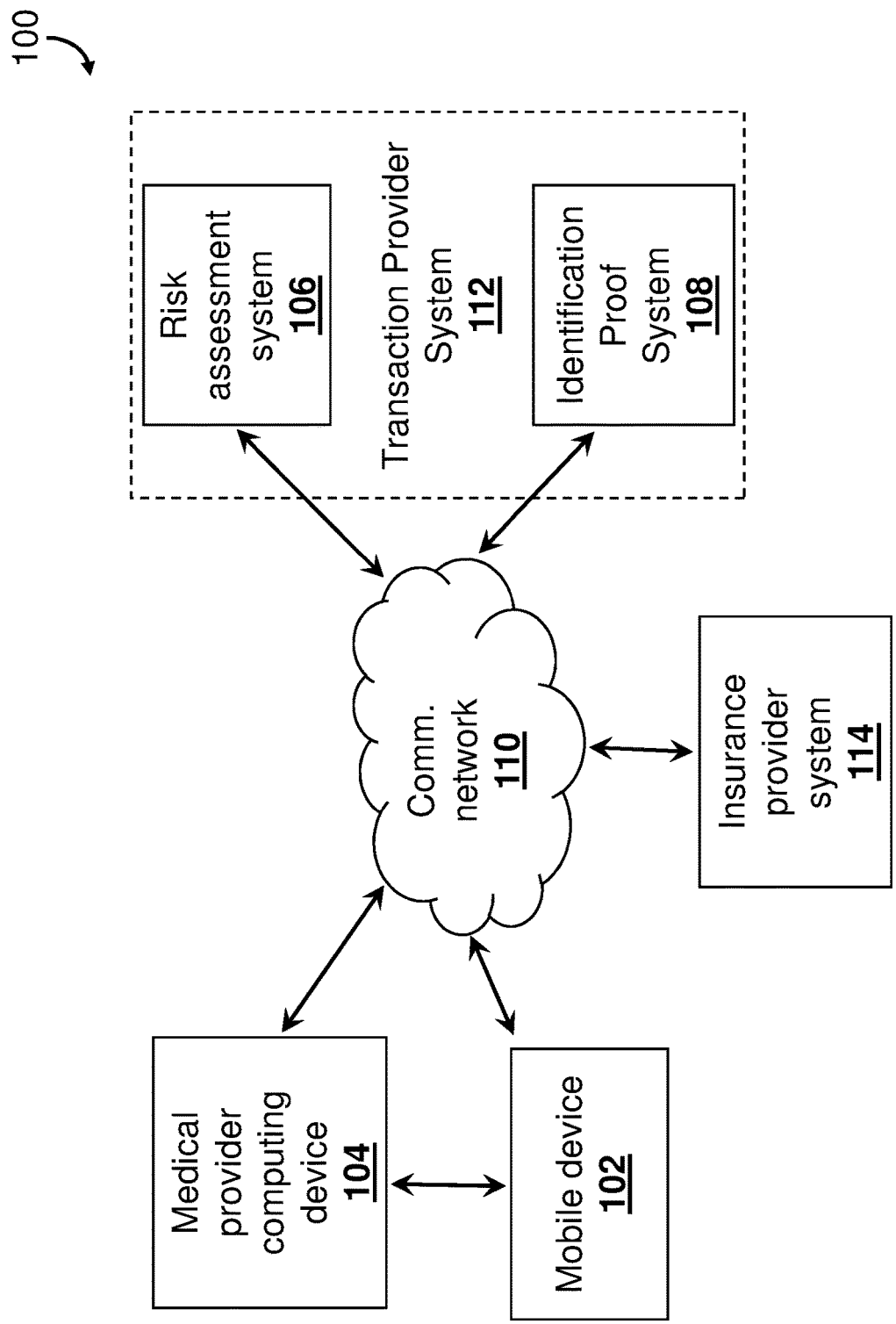
FIG. 1 is a diagram of a non-limiting embodiment of an environment in which systems, apparatuses, and/or methods, as described herein, may be implemented.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments or aspects, a message may refer to a network packet (e.g., a data packet and/or the like) that includes data.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, and/or the like) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "mobile device" may refer to one or more computing devices configured to communicate over one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any computing device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the term "token" may refer to an identifier that is used as a substitute or replacement identifier for another identifier, such as an insurance account identifier, a patient identifier, and/or the like. Tokens may be associated with identifiers in one or more data structures (e.g., one or more databases and/or the like) such that they can be used to conduct a transaction (e.g., an insurance transaction) without directly using the associated identifier, such as an insurance account number. In some examples, an account identifier, such as an insurance account identifier, may be associated with a plurality of tokens for different individuals, different uses, and/or different purposes. For example, a token may include a series of numeric and/or alphanumeric characters that may be used as a substitute for an original account identifier. For example, a token "4900 0000 0000 0001" may be used in place of an account identifier "4147 0900 0000 1234." In some non-limiting embodiments, a token may be "format preserving" and may have a numeric format that conforms to the account identifiers used in existing transaction processing networks (e.g., ISO 8583 financial transaction message format). In some non-limiting embodiments, a token may be used in place of an identifier to initiate, authorize, or resolve a transaction or represent the original credential in other systems where the original credential would typically be provided. In some non-limiting embodiments, a token value may be generated such that the recovery of the original identifier from the token value may not be computationally derived (e.g., with a one-way hash or other cryptographic function). Further, in some non-limiting embodiments, the token format may be configured to allow the entity receiving the token to identify it as a specific token type and recognize the entity that issued the token.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, "merchant system" may refer to one or more computer systems operated by or on behalf of a merchant, such as a server computer executing one or more software applications. As used herein, the term "product" may refer to one or more goods and/or services offered by a merchant.

As used herein, a "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments, a transaction service provider may include a credit card company, a debit card company, and/or the like. As used herein, the term "transaction processing system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

Non-limiting embodiments or aspects of the present disclosure are directed to systems, methods, and computer program products for patient authentication and identity risk assessment. Disclosed systems and methods consolidate identity verification into a remote, single-entity verification provider. Patient requests for insurance authorization are automatically and intelligently analyzed for authenticity before insurance providers authorize requests to use insurance. False positives and false negatives may be reduced by employing machine-learning techniques to validate patient identity. Identity theft and medical fraud are reduced by initial and secondary patient authorization requests, which may require a validation token received from an identification proof system. Computer-networked insurance systems may also rebalance their authorization communications to be real-time and prior to patient reception of medical services, as opposed to subsequent to providing of medical services. The total volume of network communications may also be reduced (saving bandwidth, processing capacity, etc.) by verifying insurance identity before providing medical services, thereby eliminating communications transmitted to clarify identity, correct identity, or correctly establish for which medical provider the insurance was requested.

Described systems and methods further reduce instance of systematic error due to mismatched patients or incorrect/incomplete data entry. The use of risk assessment models and step-up authentication procedures reduce instances of error and prevents computer resource waste (e.g., processing time, processing capacity) required to rectify errors.

Referring now to FIG. 1, illustrated is a diagram of an example environment 100 in which devices, systems, and/or methods, described herein, may be implemented. As shown in FIG. 1, environment 100 includes a mobile device 102 of a user seeking to authenticate a patient identity, a medical provider computing device 104 (e.g., a computing device associated with a medical provider, such as a desktop computer or tablet computer positioned at a medical provider office location) to interface with the mobile device 102 to facilitate patient identity authentication, a risk assessment system 106 for generating authenticity scores of patient authorization requests, an identification proof system 108 for evaluating proofs of identity, a communication network 110 (or more than one thereof) for transmission of network communications, a transaction provider system 112 for processing transactions (e.g., patient authorization requests) in an electronic payment processing network, and an insurance provider system 114 for generating patient authorization responses.

Mobile device 102 may include one or more devices capable of being in communication with medical provider computing device 104, and in communication with identification proof system 108 via communication network 110.

Medical provider computing device 104 may include one or more computing devices capable of being in communication with mobile device 102, and in communication with risk assessment system 106 (e.g., of a transaction provider system 112) via communication network 110. Medical provider computing device 104 may include one or more third party computing devices operating on behalf of a medical provider, including at a medical provider location (e.g., medical provider office) and/or operated remotely and in association with the medical provider. In some non-limiting embodiments or aspects, medical provider computing device 104 may include an interface with a transceiver for a user to communicate a patient authorization request via a mobile device 102. Medical provider computing device 104 and mobile device 102 may communicate by direct or indirect communication channels, which may include communication network 110. Mobile device 102 may also initiate a patient authorization request by presenting an identifier (e.g., a visual code) for scanning by a medical provider computing device 104.

Risk assessment system 106 may include one or more devices capable of being in communication with medical provider computing device 104, insurance provider system 114, and/or mobile device 102 via communication network 110. Risk assessment system 106 may be included in a transaction provider system 112. In some non-limiting embodiments or aspects, risk assessment system 106 may include one or more computing devices, such as a server, a group of servers, and/or other like devices. Said computing devices may include data storage devices, which may be local or remote to risk assessment system 106. In some non-limiting embodiments or aspects, risk assessment system 106 may be capable of receiving information from, storing information in, communicating information to, or searching information stored in the data storage device.

Identification proof system 108 may include one or more devices capable of being in communication with mobile device 102 via communication network 110. Identification proof system 108 may be included in a transaction provider system 112. In some non-limiting embodiments or aspects, identification proof system 108 may include one or more computing devices, such as a server, a group of servers, and/or other like devices. Said computing devices may include data storage devices, which may be local or remote to identification proof system 108. In some non-limiting embodiments or aspects, identification proof system 108 may be capable of receiving information from, storing information in, communicating information to, or searching information stored in the data storage device.

Insurance provider system 114 may include one or more devices capable of being in communication with risk assessment system 106 and/or transaction provider system 112 via communication network 110. In some non-limiting embodiments or aspects, insurance provider system 114 may include one or more computing devices, such as a server, a group of servers, and/or other like devices. Said computing devices may include data storage devices, which may be local or remote to insurance provider system 114. In some non-limiting embodiments or aspects, insurance provider system 114 may be capable of receiving information from, storing information in, communicating information to, or searching information stored in the data storage device.

Communication network 110 may include one or more wired and/or wireless networks. For example, communication network 110 may include a cellular network (e.g., a long-term evolution (LTE) network, a third generation (3G) network, a fourth generation (4G) network, a code division multiple access (CD MA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, a mesh network, a beacon network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
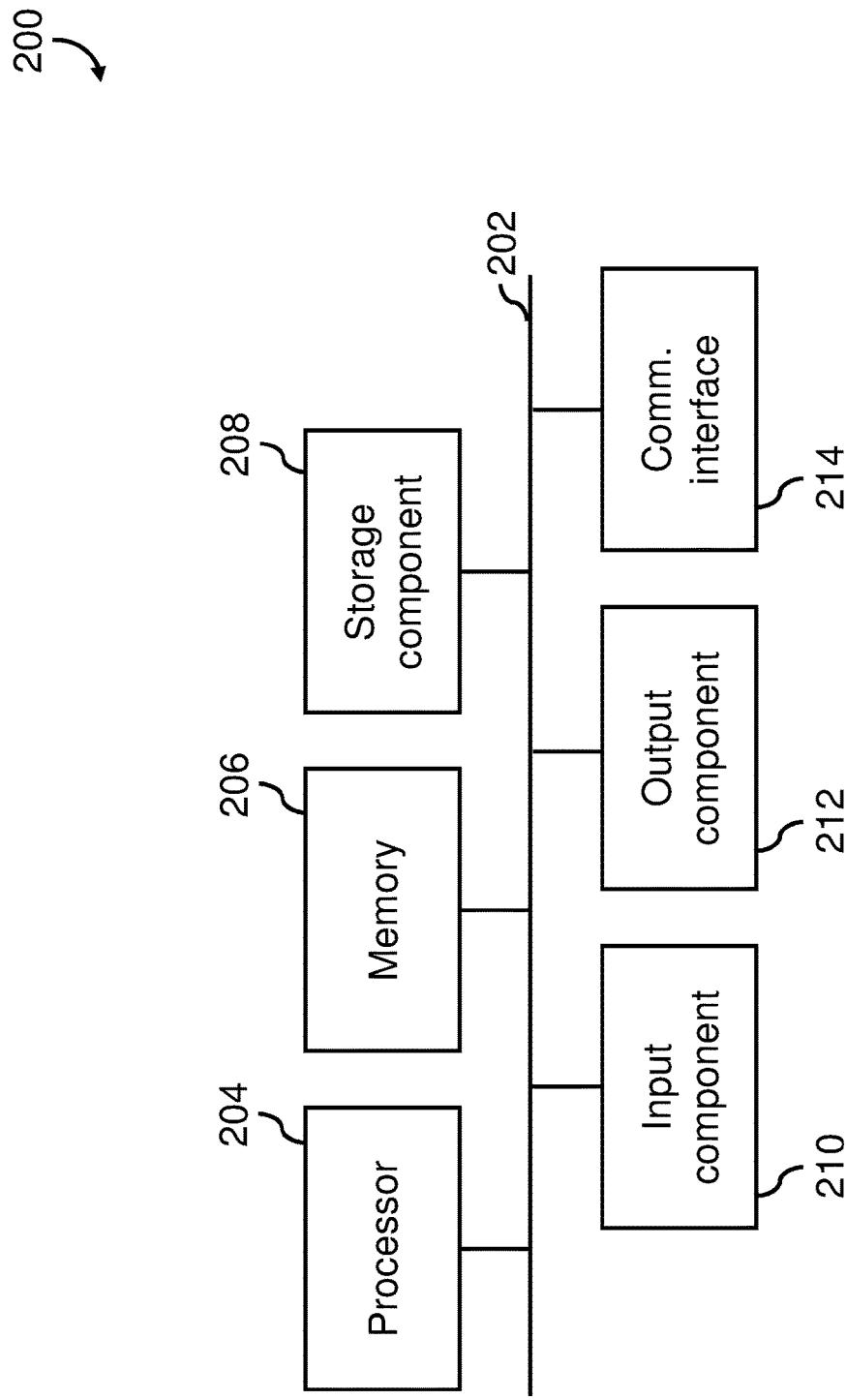
FIG. 2 is a diagram of a non-limiting embodiment of components of one or more devices of FIG. 1.

Referring now to FIG. 2, illustrated is a diagram of example components of device 200. Device 200 may correspond to one or more devices of mobile device 102, medical provider computing device 104, risk assessment system 106, identification proof system 108, transaction provider system 112, and/or other systems (e.g., a second service provider system). In some non-limiting embodiments or aspects, one or more devices of the foregoing may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a WiFi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of receiving information from, storing information in, communicating information to, or searching information stored in the data storage or one or more data structures in memory 206 and/or storage component 208. For example, the information may include encryption data, input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
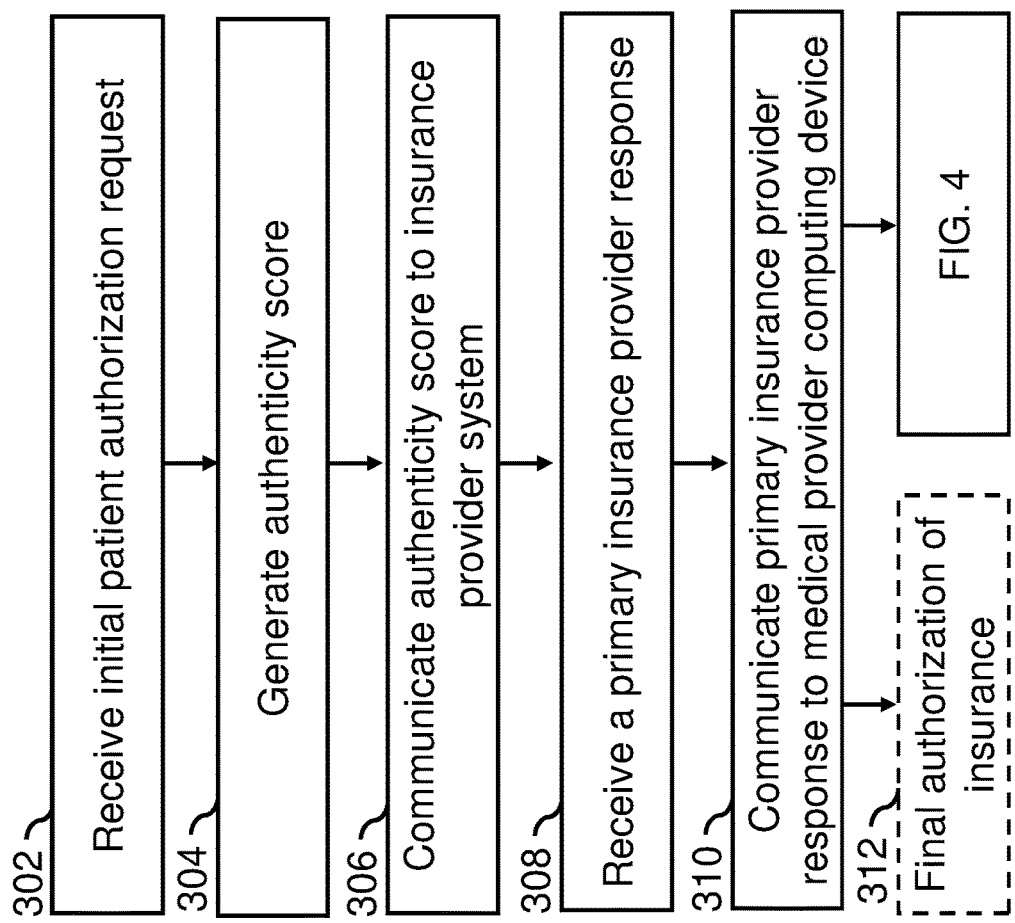
FIG. 3 is a flowchart illustrating a non-limiting embodiment of a method for patient authentication and identity risk assessment according to the principles of the present disclosure.

Referring now to FIG. 3, illustrated is a flowchart of a non-limiting embodiment or aspect of a process 300 for patient authentication and identity risk assessment. In some non-limiting embodiments or aspects, one or more of the steps of process 300 may be performed (e.g., completely, partially, and/or the like) by a system associated with risk assessment system 106, identification proof system 108, and/or transaction provider system 112.

In step 302, an initial patient authorization request may be received. For example, a transaction processing system 112 may receive an initial patient authorization request from a medical provider computing device 104. The initial patient authorization request may be received via an electronic payment processing network. The electronic payment processing network may be configured to process transactions between consumer transaction accounts and merchant accounts, the framework and network of which may be leveraged for use as a patient authentication and identity risk assessment system. The initial patient authorization request may include a patient identifier (e.g., an insurance ID number, a name, a social security number, etc.) communicated by a mobile device 102 of a user (e.g., patient 101) to the medical provider computing device 104. The patient identifier may be encrypted for communication. The patient identifier may be communicated passively (e.g., by presentation of the patient identifier for scanning by a medical provider computing device) or actively (e.g., transmitted in a communication channel).

In step 304, an authenticity score may be generated. For example, the transaction provider system 112 may generate, using an identification risk assessment model and based at least partly on the initial patient authorization request, an authenticity score. The identification risk assessment model may employ machine-learning techniques and may be trained on historic data of patient authorization requests from other patients and/or the same patient, so as to categorize/score authorization requests according to likelihood of being authentic. The authenticity score may be a qualitative or quantitative measure of likelihood of the patient authorization request being initiated by a user that is the patient 101 and/or on behalf of the patient 101.

In step 306, the authenticity score may be communicated to the insurance provider system 114. For example, the transaction processing system 112 may communicate the authenticity score to the insurance provider system 114 to cause the insurance provider system 114 to approve or decline the initial patient authorization request. Declining the initial patient authorization request may include a final decline to authorize insurance for the user. Approving the initial patient authorization request may include a final authorization of insurance for the user. Approving or declining the initial patient authorization request may include a request for further patient identification, such as through a patient identification request.

In step 308, a primary insurance provider response may be received. For example, the transaction processing system 112 may receive a primary insurance provider response from the insurance provider system 114, which may include a final decline, a final authorization, or a request for further patient identification.

In step 310, the primary insurance provider response may be communicated to the medical provider computing device 104. For example, the transaction processing system 112 may communicate at least a portion of the primary insurance provider response to the medical provider computing device 104, which may display data of the primary insurance provider response to the user of the mobile device 102 and/or other personnel. In step 312, the primary insurance provider response may include a final authorization of insurance for the patient 101 associated with the patient identifier, which may be the user of the mobile device 102. In response, the medical provider may provide services using the insurance information of the patient 101. The patient authorization process may continue (see FIG. 4) if the primary insurance provider response does not include a final authorization of insurance at this step.

Figure 4:
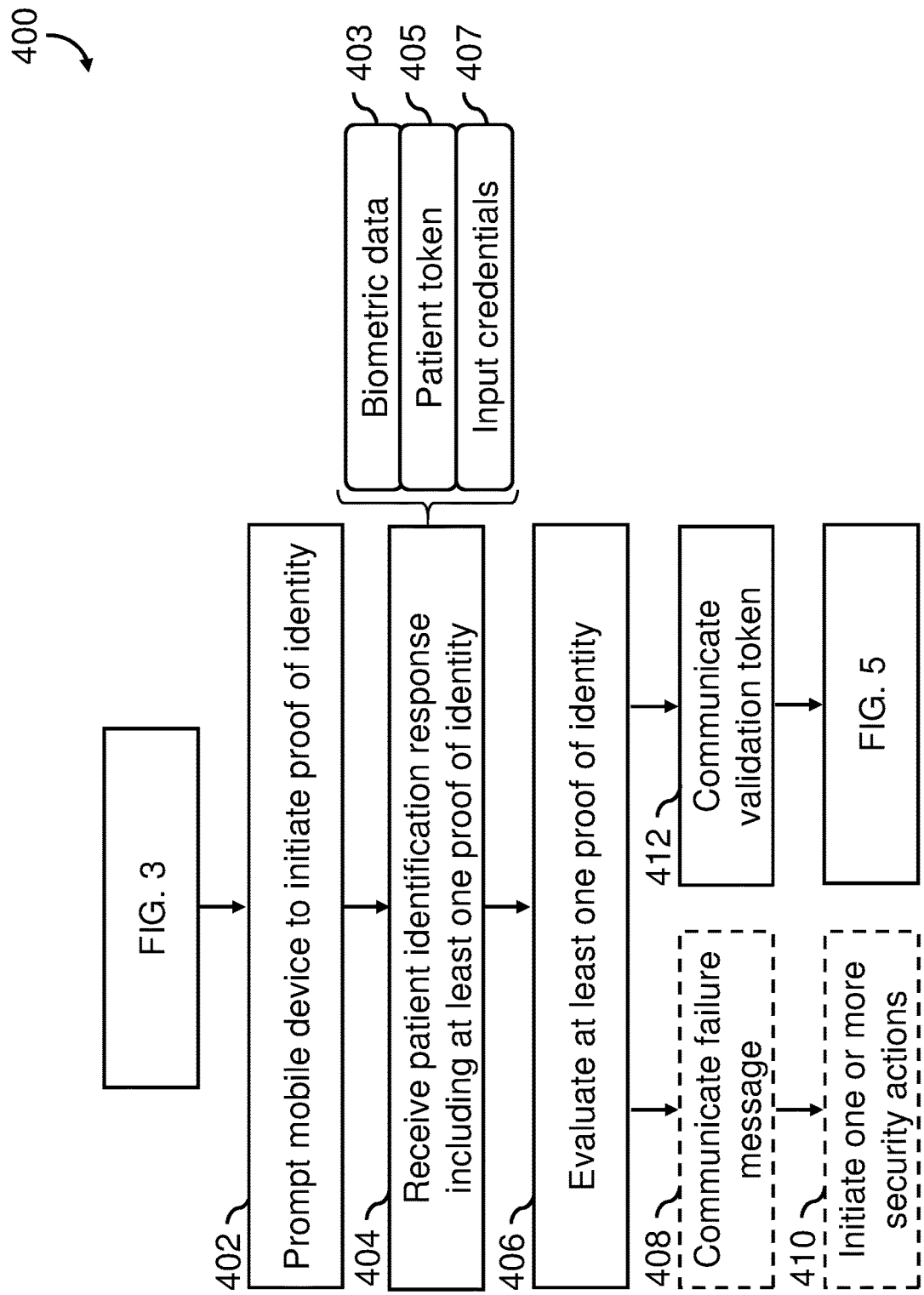
FIG. 4 is a flowchart illustrating a non-limiting embodiment of a method for patient authentication and identity risk assessment according to the principles of the present disclosure.

Referring now to FIG. 4, illustrated is a flowchart of a non-limiting embodiment or aspect of a process 400 for patient authentication and identity risk assessment. In some non-limiting embodiments or aspects, one or more of the steps of process 400 may be performed (e.g., completely, partially, and/or the like) by a system associated with risk assessment system 106, identification proof system 108, and/or transaction provider system 112.

In step 402, the mobile device 102 may be prompted to initiate a patient identification response. For example, the primary insurance provider response, communicated from the transaction processing system 112 or insurance provider system 114, may include a prompt (e.g., message) for the mobile device to initiate a patient identification response to prove patient identity. The prompt may be communicated from the medical provider computing device 104 to the mobile device 102. The prompt may include a code, link, identifier, and/or the like to trigger a patient identification response from the mobile device 102.

In step 404, the patient identification response may be received from the mobile device 102. For example, the transaction processing system 112 (e.g., the identification proof system 108 thereof) or the insurance provider system 114 may receive the patient identification response from the mobile device 102. The patient identification response may include the patient identifier and one or more proofs of identity, including, but not limited to: biometric data 403 captured by the mobile device 102 (e.g., fingerprint scan, retina scan, facial scan, etc.); a patient identity token 405 stored on the mobile device 102; patient credentials 407 input by the user on the mobile device 102 (e.g., username, password, answer to security question, etc.); or any combination thereof.

In step 406, the at least one proof of identity may be evaluated. For example, the transaction processing system 112 or insurance provider system 114 may evaluate the one or more proofs of the patient identification response. If one or more proofs are not valid, at step 408, the transaction processing system 112 or insurance provider system 114 may communicate an identification evaluation response to the mobile device that includes a failure message. The identification evaluation response may include a message configured to represent the results of an evaluation regarding the identity of the patient 101. The transaction processing system 112 and/or insurance provider system 114 may also, in step 410, initiate one or more insurance security actions. Insurance security actions may include, but are not limited to: freezing (e.g., suspending account activity) an insurance account associated with the patient identifier; communicating an alert to a registered computing device (e.g., a mobile device or other communication device) associated with the patient identifier (e.g., registered when the patient 101 sets up an insurance profile); communicating an alert to the medical provider computing device; or any combination thereof.

If one or more proofs are valid, in step 412, an identification evaluation response may be communicated that includes a validation token. A validation token may be a token representative of the identity of the patient 101 having been validated. For example, the transaction processing system 112 or insurance provider system 114 may communicate an identification evaluation response to the mobile device 102 that includes a validation token representative of the user having satisfied one or more proofs of identity. Having completed a patient identification process, the user may then use the mobile device 102 to initiate a secondary patient authorization request with the medical provider computing device.

Figure 5:
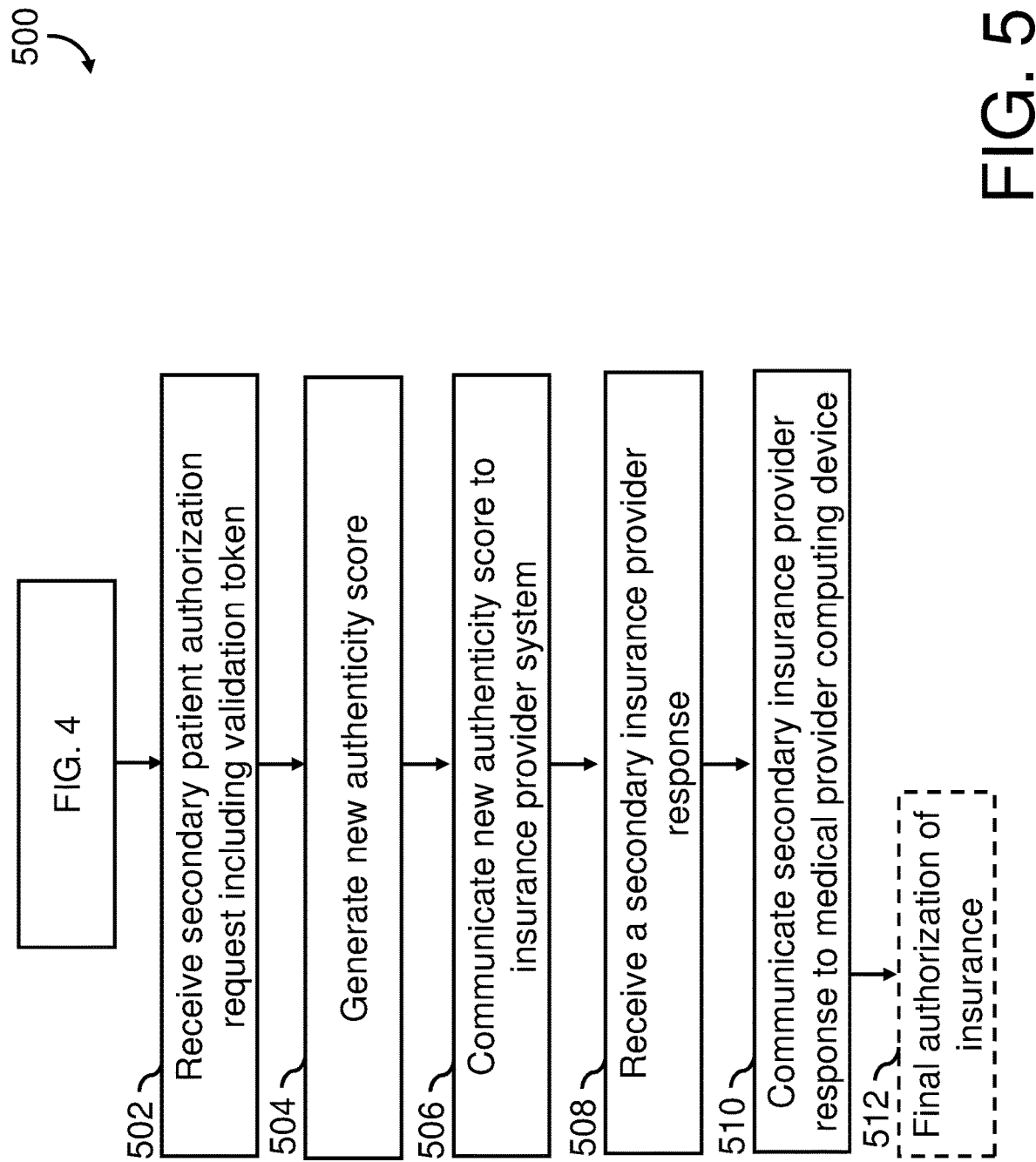
FIG. 5 is a flowchart illustrating a non-limiting embodiment of a method for patient authentication and identity risk assessment according to the principles of the present disclosure.

Referring now to FIG. 5, illustrated is a flowchart of a non-limiting embodiment or aspect of a process 500 for patient authentication and identity risk assessment. In some non-limiting embodiments or aspects, one or more of the steps of process 500 may be performed (e.g., completely, partially, and/or the like) by a system associated with risk assessment system 106, identification proof system 108, and/or transaction provider system 112.

In step 502, a secondary patient authorization request may be received. For example, the transaction processing system 112 (e.g., a risk assessment system 106 thereof) may receive a secondary patient authorization request from a medical provider computing device 104. The secondary patient authorization request may be a message configured to prompt approval or decline of patient insurance after a patient identification process has been completed. The secondary patient authorization request may be received via an electronic payment processing network. The electronic payment processing network may be configured to process transactions between consumer transaction accounts and merchant accounts, the framework and network of which may be leveraged for use as a patient authentication and identity risk assessment system 106. The secondary patient authorization request may include a patient identifier (e.g., an insurance ID number, a name, a social security number, etc.) communicated by the mobile device of the user to the medical provider computing device. The secondary patient authorization request may further include the validation token received from the transaction processing system 112 or insurance provider system 114. The patient identifier and/or validation token may be encrypted for communication.

In step 504, a new authenticity score may be generated. For example, the transaction processing system 112 (e.g., the risk assessment system 106 thereof) may generate, using an identification risk assessment model and based at least partly on the secondary patient authorization request, a new authenticity score. The new authenticity score may be a qualitative or quantitative measure of likelihood of the patient authorization request being initiated by a user that is the patient. The validation token may contribute partly or wholly toward an authenticity score that is likely or configured to authorize the patient.

In step 506, the new authenticity score may be communicated to the insurance provider system 114. For example, the transaction processing system 112 (e.g., the risk assessment system 106 thereof) may communicate the new authenticity score to an insurance provider system 114 to cause the insurance provider system 114 to approve or decline the secondary patient authorization request. Declining the secondary patient authorization request may include a final decline to authorize insurance for the user. Approving the secondary patient authorization request may include a final authorization of insurance for the user, as in step 512.

In step 508, a secondary insurance provider response may be received from the insurance provider system 114. For example, the transaction processing system 112 (e.g., the risk assessment system 106 thereof) may receive a secondary insurance provider response from the insurance provider system 114, which may include a final decline or a final authorization of the secondary patient authorization request.

In step 510, the secondary insurance provider response may be communicated to the medical provider computing device 104. For example, the transaction processing system 112 (e.g., the risk assessment system 106 thereof) may communicate at least a portion of the secondary insurance provider response to the medical provider computing device 104, which may display data of the secondary insurance provider response to the user of the mobile device 102 and/or other personnel. In step 512, the primary insurance provider response may include a final authorization of insurance for the patient 101 associated with the patient identifier, which may be the user of the mobile device 102. In response, the medical provider may provide services using the insurance information of the patient 101.

Figure 6:
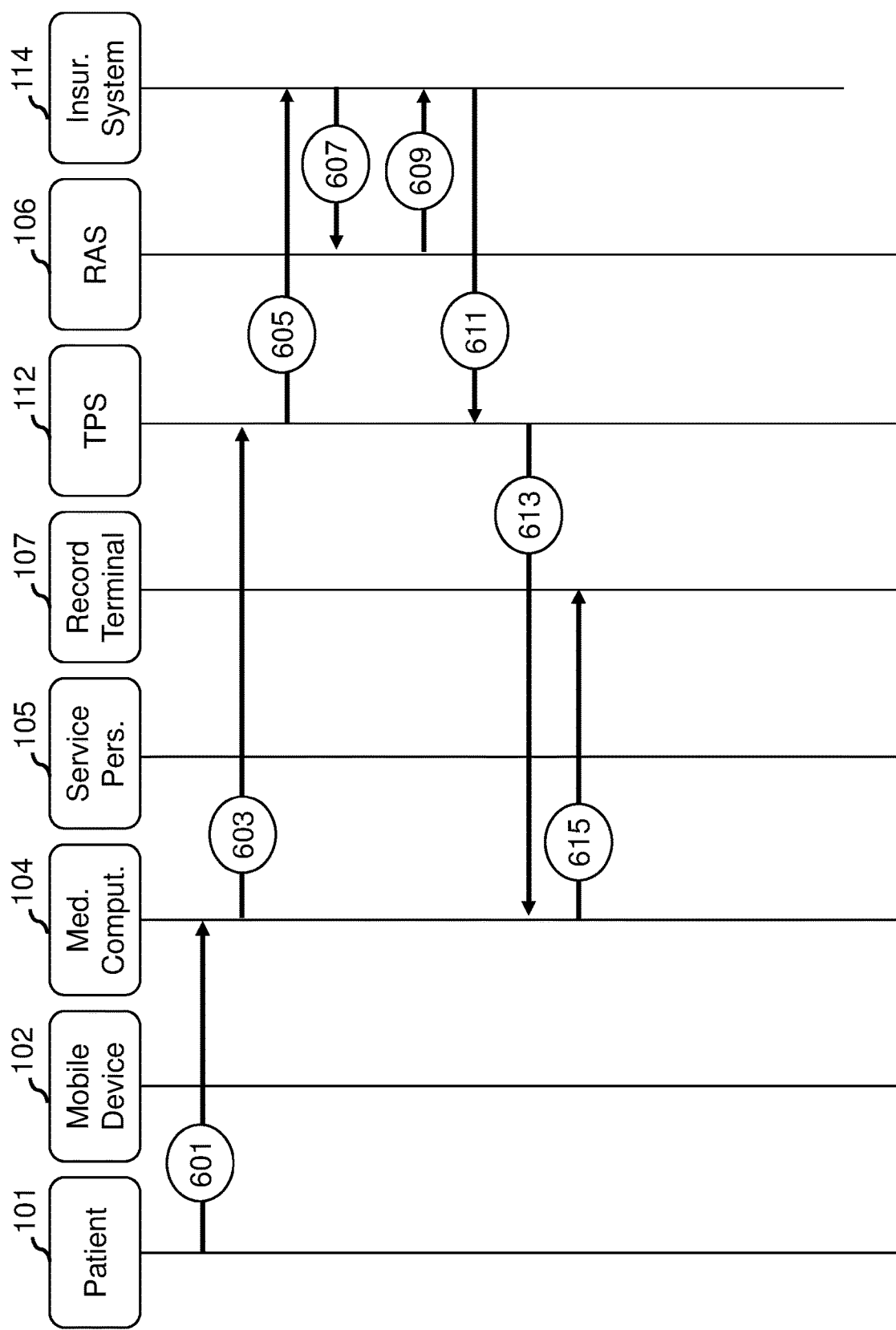
FIG. 6 is a process diagram illustrating a non-limiting embodiment of a method for patient authentication and identity risk assessment according to the principles of the present disclosure.

With reference to FIG. 6, and in non-limiting embodiments or aspects, provided is a process diagram illustrating a method of patient authentication and identity risk assessment. Steps of the depicted method may be performed by one or more of a mobile device 102, a medical provider computing device 104, a record terminal 107 (e.g., a record database, which may be associated with and/or included in a medical provider computing device 104, and which may be associated with the medical provider), a transaction processing system 112 (also abbreviated "TPS"), a risk assessment system 106 (also abbreviated "RAS"), which may be associated with and/or included in a transaction processing system 112, and an insurance provider system 114. It will be appreciated that the described actions of the patient 101 may also be executed by a user operating the mobile device 102 on behalf of the patient 101. The illustrated method of FIG. 6 provides the benefit of improved system security and reduced network communications, by reducing the unauthorized generation of insurance records and preventing the triggering of electronic insurance processes due to fraudulent insurance requests.

In step 601, a patient identifier may be communicated to a medical provider computing device 104. For example, a patient 101 may use a mobile device 102 to communicate a patient identifier to the medical provider computing device 104, such as through a mobile application (e.g., triggering networked and/or short-range communication, such as by tapping a mobile device 102 near a reader), by presenting a visual representation of the patient identifier (e.g., a barcode) for scanning, and/or the like. The medical provider computing device 104 may be operated by a medical provider service personnel 105. The medical provider computing device 104 may show patient information on a display of the medical provider computing device 104, as communicated from the mobile device 102 with the patient identifier. The medical provider computing device 104 may also be associated with and/or include a record terminal 107 (e.g., a computing device including and/or associated with a database, for local storage of patient records). The patient identifier may also be associated with a payment device of the user and may be provided to the medical provider computing device 104 via a payment device interface (e.g., a credit card chip reader).

In step 603, an initial patient authorization request may be communicated to a transaction processing system 112. The initial patient authorization request may be a message configured to cause the transaction processing system 112 to communicate with an insurance provider system 114 for the determination of identity and authenticity of the patient associated with the initial patient authorization request. The initial patient authorization request may include the patient identifier. For example, the medical provider computing device 104 may communicate the initial patient authorization request to the transaction processing system 112. The transaction processing system 112 may include and/or be associated with an identification proof system 108 and/or a risk assessment system 106.

In step 605, the initial patient authorization request may be further communicated to an insurance provider system 114. For example, the transaction processing system 112 may communicate the initial patient authorization request to an insurance provider system 114 associated with the patient identifier of the initial patient authorization request. The transaction processing system 112 may modify the initial patient authorization request before communicating the initial patient authorization request to the insurance provider system 114, such as by populating the initial patient authorization request with additional data about the communication (e.g., medical provider computing device 104 identifier, time received, transaction processing system 112 identifier, etc.).

In step 607, a risk evaluation request may be received from the insurance provider system 114. For example, the risk assessment system 106 may receive the risk evaluation request from the insurance provider system 114. In response to receipt of the risk evaluation request, the risk assessment system 106 may generate, using an identification risk assessment model, an authenticity score. The authenticity score may be generated based at least partly on the initial patient authorization request (e.g., a location of the request, a time of the request, a medical provider identifier, the patient identifier, and/or the like). The authenticity score may be a qualitative (e.g., categorical) or quantitative (e.g., score from 0 to 100) output from the identification risk assessment model.

In step 609, the authenticity score may be communicated to an insurance provider system 114. For example, the risk assessment system 106 may communicate the authenticity score to the insurance provider system 114. The communication of the authenticity score to the insurance provider system 114 may be configured to cause the insurance provider system 114 to approve or decline the initial patient authorization request.

In step 611, a primary insurance provider response may be communicated to the transaction processing system 112. For example, the insurance provider system 114 may, based on the authenticity score, generate a primary insurance provider response and communicate the primary insurance provider response to the transaction processing system 112. The primary insurance provider response may be associated with an approval or a decline of the initial patient authorization request.

In step 613, at least a portion of the primary insurance provider response may be communicated to the medical provider computing device 104. For example, the transaction processing system 112 may communicate at least a portion of the primary insurance provider response to the medical provider computing device 104. At least a portion of the primary insurance provider response representative of an approval or a decline of the initial patient authorization request may be communicated to the medical provider computing device 104.

In step 615, a patient insurance token may be communicated to the record terminal 107. The patient insurance token may be a token used to uniquely identify a patient as validly being associated with an insurance provider. For example, the medical provider computing device 104 may communicate a patient insurance token to the record terminal 107 in anticipation of medical services to be rendered to the patient 101 associated with the patient insurance token. The patient insurance token may be received from the mobile device 102 in the initial patient authorization request. Additionally or alternatively, the patient insurance token may be received from the insurance provider system 114 (e.g., via the transaction processing system 112) in the primary insurance provider response.

Figure 7:
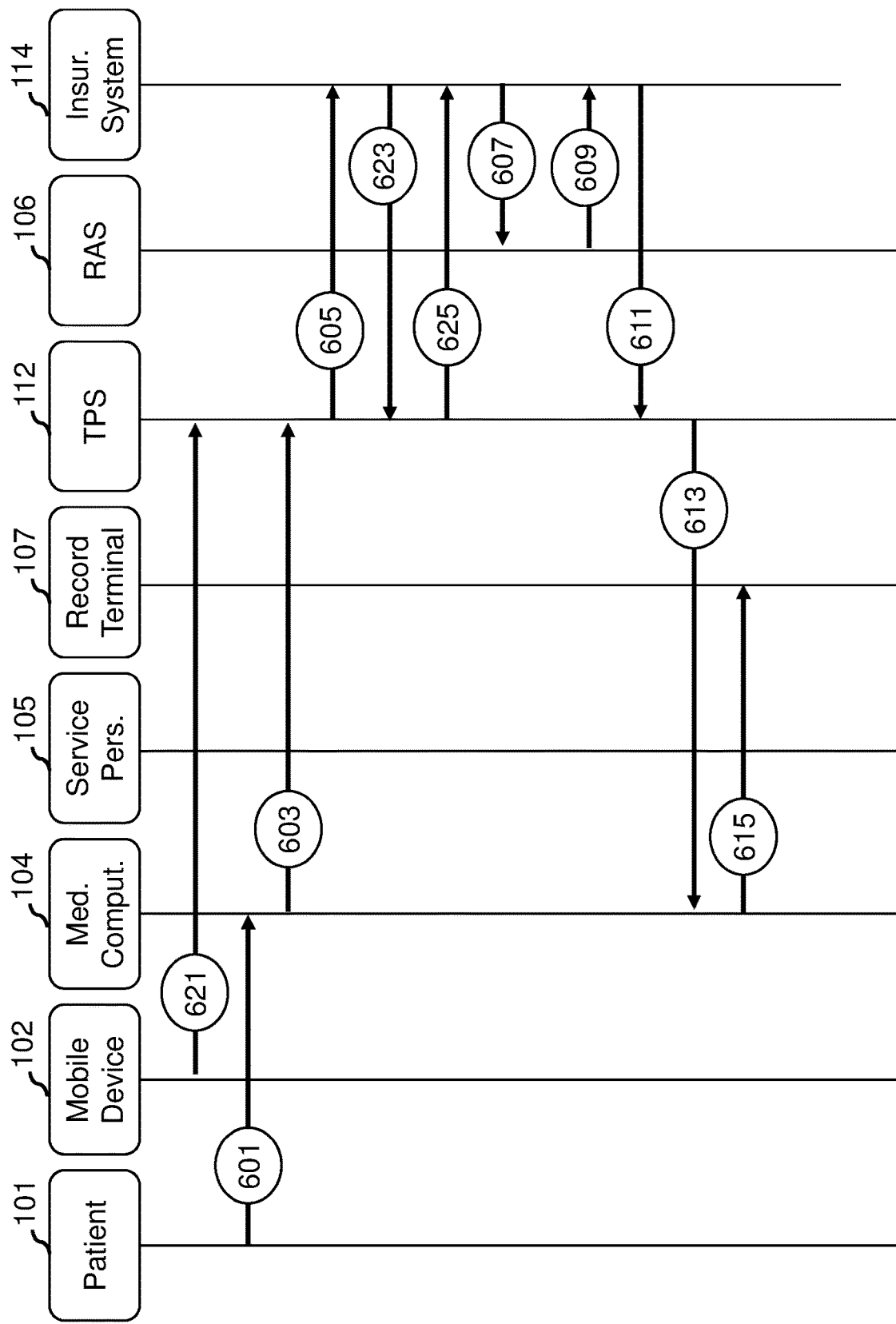
FIG. 7 is a process diagram illustrating a non-limiting embodiment of a method for patient authentication and identity risk assessment according to the principles of the present disclosure.

With reference to FIG. 7, and in non-limiting embodiments or aspects, provided is a process diagram illustrating a method of patient authentication and identity risk assessment. FIG. 7 illustrates additional steps for authentication in comparison to FIG. 6. Steps of the depicted method may be performed by one or more of a mobile device 102, a medical provider computing device 104, a record terminal 107, which may be associated with and/or included in a medical provider computing device 104, a transaction processing system 112, a risk assessment system 106, which may be associated with and/or included in a transaction processing system 112, and an insurance provider system 114. It will be appreciated that the described actions of the patient 101 may also be executed by a user operating the mobile device 102 on behalf of the patient 101. The illustrated method of FIG. 7 provides the benefit of improved system security and reduced network communications, by reducing the unauthorized generation of insurance records and preventing the triggering of electronic insurance processes due to fraudulent insurance requests, particularly by leveraging location validation of the mobile device 102.

In step 621, a location of the mobile device 102 may be communicated to the transaction processing system 112. For example, the mobile device 102 may communicate a location of the mobile device 102 to the transaction processing system 112. The mobile device 102 may determine its location by a global positioning satellite (GPS) receiver included in the mobile device 102. The mobile device 102 may also determine its location by communicating over internet protocol with a local router to determine an approximate location based on the location of the local router.

Steps 601, 603, and 605 may be executed as described above with respect to FIG. 6. For example, the patient 101 may use the mobile device 102 to communicate a patient identifier to the medical provider computing device 104, in step 601. The medical provider computing device 104 may generate and communicate an initial patient authorization request to the transaction processing system 112, in step 603. The transaction processing system 112 may communicate the initial patient authorization request to the insurance provider system 114, in step 605.

In step 623, a mobile device authentication request may be communicated to the transaction processing system 112. The mobile device authentication request may include a message configured to cause the transaction processing system 112 to determine and communicate an assessment of authenticity based on information associated with the mobile device 102. For example, the insurance provider system 114 may communicate a mobile device authentication request to the transaction processing system 112. The mobile device authentication request may cause the transaction processing system 112 to determine an assessment of authenticity based on information associated with the mobile device 102, including the location of the mobile device 102 received in step 621. In some non-limiting embodiments or aspects, the location of the mobile device 102 may be compared with the location of the medical provider computing device 104 to generate an assessment. The location of the medical provider computing device 104 may be received in the initial patient authorization request in step 603. An assessment may be qualitative (e.g., categorical) or quantitative (e.g., a score from 0 to 100) representative of the level of authenticity of the mobile device 102 being at the location of the medical provider computing device 104. The closer the location of the mobile device 102 is to the location of the medical provider computing device 104, the higher the level of authenticity may be as reflected by the assessment.

In step 623, the assessment of authenticity based on information associated with the mobile device 102 may be communicated to the insurance provider system 114. For example, the transaction processing system 112 may communicate the assessment to the insurance provider system 114 after the assessment is determined in response to step 623. The insurance provider system 114 may evaluate the assessment of authenticity based on information associated with the mobile device 102. If the insurance provider system 114 determines that the assessment is indicative of a lack of authenticity (e.g., a score of the assessment does not satisfy a threshold level of authenticity), then the insurance provider system 114 may decline the initial patient authorization request. If the insurance provider system 114 determines that the assessment is not indicative of a lack of authenticity, and/or determines that the assessment is indicative of authenticity, the insurance provider system 114 may prompt further evaluation of the initial patient authorization request, such as by executing step 607.

Steps 607, 609, 611, 613, and 615 may be executed as described above with respect to FIG. 6. For example, the risk assessment system 106 may receive the risk evaluation request from the insurance provider system 114, in step 607, which may trigger the risk assessment system 106 to generate an authenticity score based on an identification risk assessment model. The risk assessment system 106 may communicate the authenticity score to the insurance provider system 114, in step 609. The insurance provider system 114 may, based on the authenticity score, generate a primary insurance provider response and communicate the primary insurance provider response to the transaction processing system 112, in step 611. The primary insurance provider response may be associated with an approval or a decline of the initial patient authorization request. The transaction processing system 112 may communicate at least a portion of the primary insurance provider response to the medical provider computing device 104, in step 613. The medical provider computing device 104 may communicate a patient insurance token to the record terminal 107 in anticipation of medical services to be rendered to the patient 101 associated with the patient insurance token, in step 615.

Figure 8:
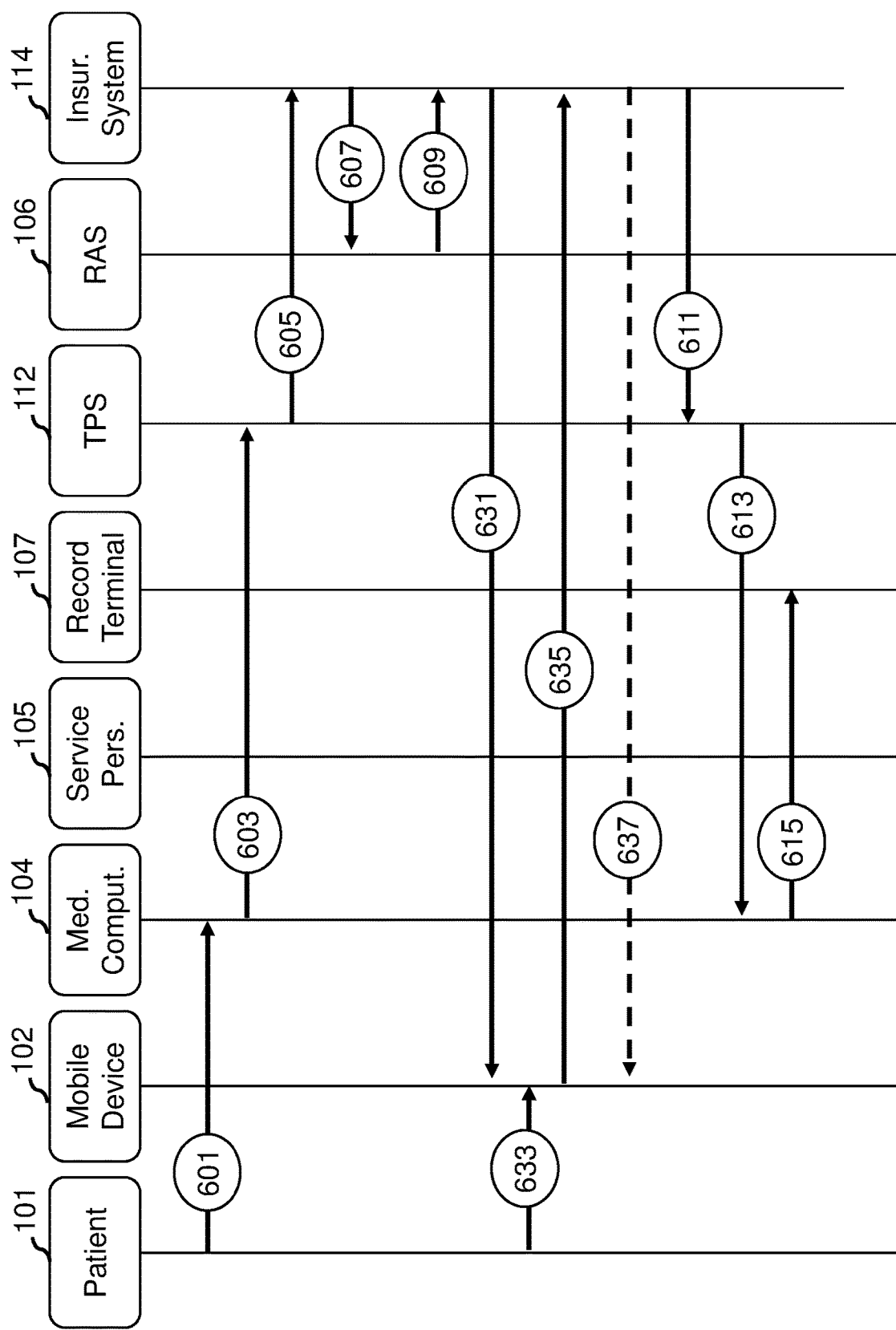
FIG. 8 is a process diagram illustrating a non-limiting embodiment of a method for patient authentication and identity risk assessment according to the principles of the present disclosure.

With reference to FIG. 8, and in non-limiting embodiments or aspects, provided is a process diagram illustrating a method of patient authentication and identity risk assessment. FIG. 8 illustrates additional steps for authentication/confirmation in comparison to FIG. 6. Steps of the depicted method may be performed by one or more of a mobile device 102, a medical provider computing device 104, a record terminal 107, which may be associated with and/or included in a medical provider computing device 104, a transaction processing system 112, a risk assessment system 106, which may be associated with and/or included in a transaction processing system 112, and an insurance provider system 114. It will be appreciated that the described actions of the patient 101 may also be executed by a user operating the mobile device 102 on behalf of the patient 101. The illustrated method of FIG. 8 provides the benefit of improved system security and reduced network communications, by reducing the unauthorized generation of insurance records and preventing the triggering of electronic insurance processes due to fraudulent insurance requests, particularly by leveraging a step-up authentication/confirmation communication process with the mobile device 102. Step-up authentication may be under a Fast Identity Online (FIDO) authentication model.

Steps 601, 603, 605, 607, and 609 may be executed as described above with respect to FIG. 6. For example, the patient 101 may use the mobile device 102 to communicate a patient identifier to the medical provider computing device 104, in step 601. The medical provider computing device 104 may generate and communicate an initial patient authorization request to the transaction processing system 112, in step 603. The transaction processing system 112 may communicate the initial patient authorization request to the insurance provider system 114, in step 605. The risk assessment system 106 may receive the risk evaluation request from the insurance provider system 114, in step 607, which may trigger the risk assessment system 106 to generate an authenticity score based on an identification risk assessment model. The risk assessment system 106 may communicate the authenticity score to the insurance provider system 114, in step 609.

In response to the authenticity score being communicated in step 609, a step-up authentication process may be triggered, as shown in steps 631, 633, and 635. The authenticity score may be indicative of suspicious behavior detected by the identification risk assessment model.

In step 631, a patient identification request may be communicated to the mobile device 102. The patient identification request may include a message configured to prompt the patient 101 to use the mobile device 102 to execute a patient identification response. For example, the insurance provider system 114 may communicate a patient identification request to the mobile device 102, directly or indirectly, such as via the transaction processing system 112. The patient identification request may be a push message communicated to the patient 101 through an application of the mobile device 102. The patient identification request may also be a confirmation request notifying the patient 101 of the request by the medical provider for use of the patient's 101 insurance. For example, a confirmation request may cause the mobile device 102 to display a notification such as: "Service is being requested by Dr. Anderson. Swipe to confirm." In response to the confirmation request, the patient 101 may confirm or deny that service was requested.

In step 633, at least one proof of identity may be executed at the mobile device 102. For example, the patient 101 may use the mobile device 102 to input, initiate, and/or provide a proof of identity. A proof of identity may include, but is not limited to, biometric data 403 captured by the mobile device 102 (e.g., a facial recognition scan, a fingerprint scan, etc.), a patient identity token 405 stored on the mobile device 102, patient credentials 407 (e.g., a username and password) input by the patient on the mobile device, or any combination thereof.

In step 635, the at least one proof of identity may be communicated to the insurance provider system 114, directly or indirectly, such as through the transaction processing system 112. For example, mobile device 102 may communicate the at least one proof of identity to the insurance provider system 114 for evaluation of the proof of identity. In response to receiving the proof of identity, the insurance provider system 114 may evaluate the proof of identity for validity, such as by comparing received biometric data 403 with stored biometric data associated with the patient, by comparing a received patient identity token 405 with a stored patient identity token associated with the patient, by comparing received patient credentials 407 with stored patient credentials associated with the patient, and/or the like.

If the insurance provider system 114 determines that the at least one proof of identity includes one or more invalid proofs, the insurance provider system 114 may communicate an identification evaluation response to the mobile device that includes a failure message, in step 637. Additionally or alternatively, the insurance provider system 114 may initiate one or more insurance security actions, including one or more of: freezing an insurance account associated with the patient identifier; communicating an alert to a registered computing device associated with the patient identifier; communicating an alert to the medical provider computing device 104; or any combination thereof.

If the insurance provider system 114 determines the at least one proof of validity includes one or more valid proofs, the insurance provider system 114 may communicate an identification evaluation response to the mobile device that includes a success message, in step 637. The success message may include a validation token, which may be a token that indicates the insurance provider system 114 has validated the at least one proof of validity.

If the insurance provider system 114 determines the at least one proof of validity includes one or more valid proofs, steps 611, 613, and 615 may be executed as described above with respect to FIG. 6. For example, the insurance provider system 114 may, based on the authenticity score, generate a primary insurance provider response and communicate the primary insurance provider response to the transaction processing system 112, in step 611. The primary insurance provider response may be associated with an approval or a decline of the initial patient authorization request. The transaction processing system 112 may communicate at least a portion of the primary insurance provider response to the medical provider computing device 104, in step 613. The medical provider computing device 104 may communicate a patient insurance token to the record terminal 107 in anticipation of medical services to be rendered to the patient 101 associated with the patient insurance token, in step 615.

Figure 9:
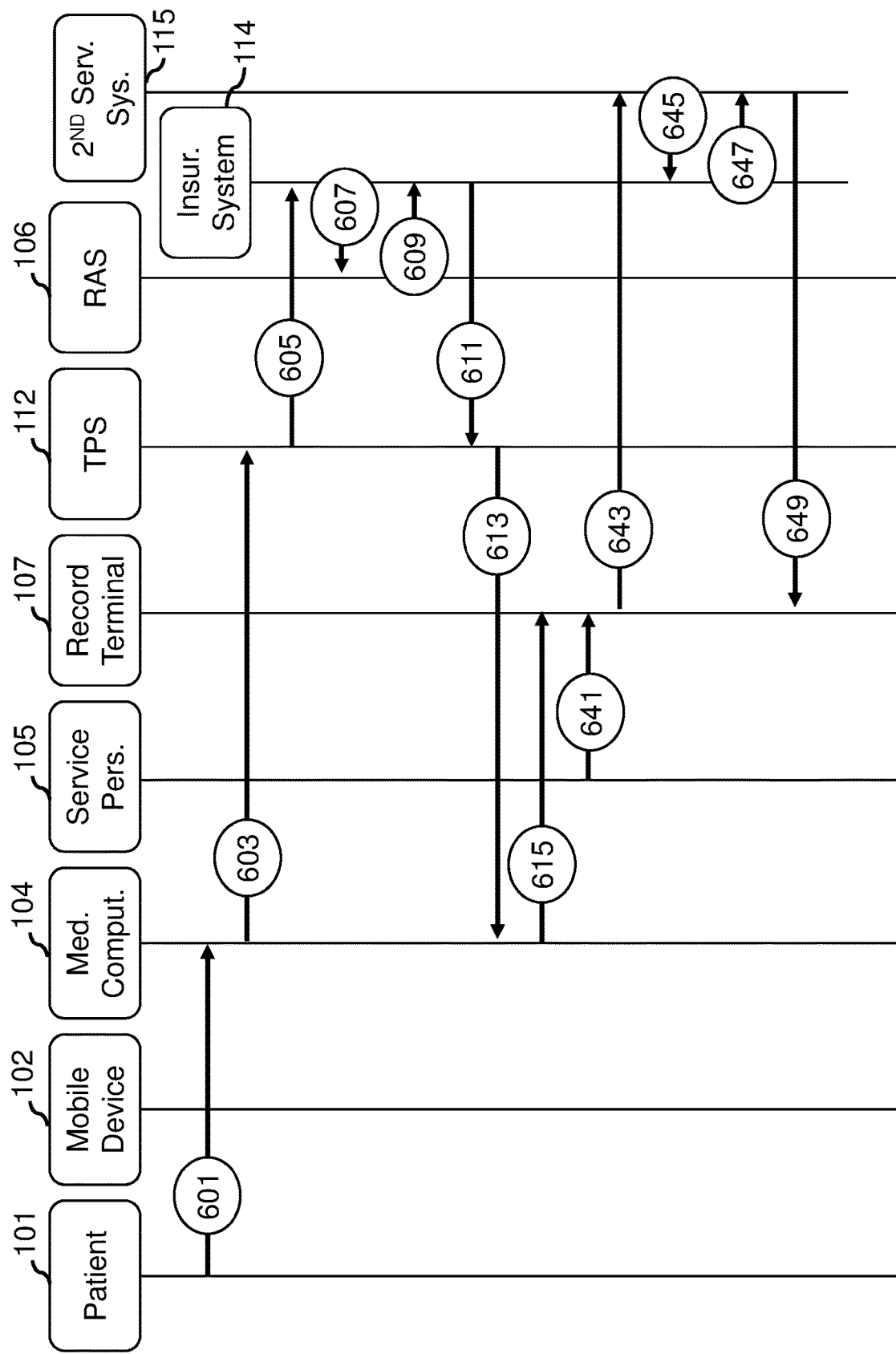
FIG. 9 is a process diagram illustrating a non-limiting embodiment of a method for patient authentication and identity risk assessment according to the principles of the present disclosure.

With reference to FIG. 9, and in non-limiting embodiments or aspects, provided is a process diagram illustrating a method of patient authentication and identity risk assessment. FIG. 9 illustrates a method including a record sharing framework, in comparison to FIG. 6. Steps of the depicted method may be performed by one or more of a mobile device 102, a medical provider computing device 104, a record terminal 107, which may be associated with and/or included in a medical provider computing device 104, a transaction processing system 112, a risk assessment system 106, which may be associated with and/or included in a transaction processing system 112, an insurance provider system 114, and a second service provider system 115. It will be appreciated that the described actions of the patient 101 may also be executed by a user operating the mobile device 102 on behalf of the patient 101. The illustrated method of FIG. 9 provides the benefit of improved system security and reduced network communications, by reducing unauthorized electronic record transfers and preventing the triggering of electronic insurance processes due to fraudulent insurance requests, particularly by leveraging a patient insurance token.

Steps 601, 603, 605, 607, and 609 may be executed as described above with respect to FIG. 6. For example, the patient 101 may use the mobile device 102 to communicate a patient identifier to the medical provider computing device 104, in step 601. The medical provider computing device 104 may generate and communicate an initial patient authorization request to the transaction processing system 112, in step 603. The transaction processing system 112 may communicate the initial patient authorization request to the insurance provider system 114, in step 605. The risk assessment system 106 may receive the risk evaluation request from the insurance provider system 114, in step 607, which may trigger the risk assessment system 106 to generate an authenticity score based on an identification risk assessment model. The risk assessment system 106 may communicate the authenticity score to the insurance provider system 114, in step 609.

Steps 611, 613, and 615 may also be executed as described above with respect to FIG. 6. For example, the insurance provider system 114 may, based on the authenticity score, generate a primary insurance provider response and communicate the primary insurance provider response to the transaction processing system 112, in step 611. The primary insurance provider response may be associated with an approval or a decline of the initial patient authorization request. If the primary insurance provider response is associated with an approval of the initial patient authorization request, the primary insurance provider response may include a patient insurance token. The transaction processing system 112 may communicate at least a portion of the primary insurance provider response to the medical provider computing device 104, in step 613, including the patient insurance token. The medical provider computing device 104 may communicate the patient insurance token to the record terminal 107 in anticipation of medical services to be rendered to the patient 101 associated with the patient insurance token, in step 615.

In step 641, the record terminal 107 may receive a request for patient records from a second service provider system 115. For example, the service personnel 105 may input the request for patient records into the record terminal 107. The record terminal 107 may identify the stored patient insurance token previously received and stored in step 615.

In step 643, the request for patient records may be communicated to the second service provider system 115. For example, the record terminal 107 may communicate the records request to the second service provider system 115. The records request may include the patient insurance token. The patient insurance token may be used by the second service provider system 115 to validate that the patient 101 was previously authorized by the insurance provider system 114.

In step 645, the second service provider system, prior to sending patient records back to the record terminal 107, may communicate the patient insurance token to the insurance provider system 114. The insurance provider system 114 may evaluate the patient insurance token and determine that the patient insurance token is a valid token and that the patient insurance token corresponds to the patient 101 for which records are being requested. The insurance provider system 114 may further determine if the patient 101 has authorized record sharing.

In step 647, if the patient insurance token is determined to be valid and corresponds to the patient 101 for which records are being requested, the insurance service provider system 114 may communicate a response to the second service provider system 115 indicating that record sharing is approved. The approval of record sharing may be conditioned on the patient 101 previously authorizing record sharing in a communication with the insurance provider system 114.

In step 649, the requested records may be communicated to the record terminal 107. For example, the second service provider system 115 may communicate patient records stored at the second service provider system 115, in association with the patient 101, to the record terminal 107.

Figure 10:
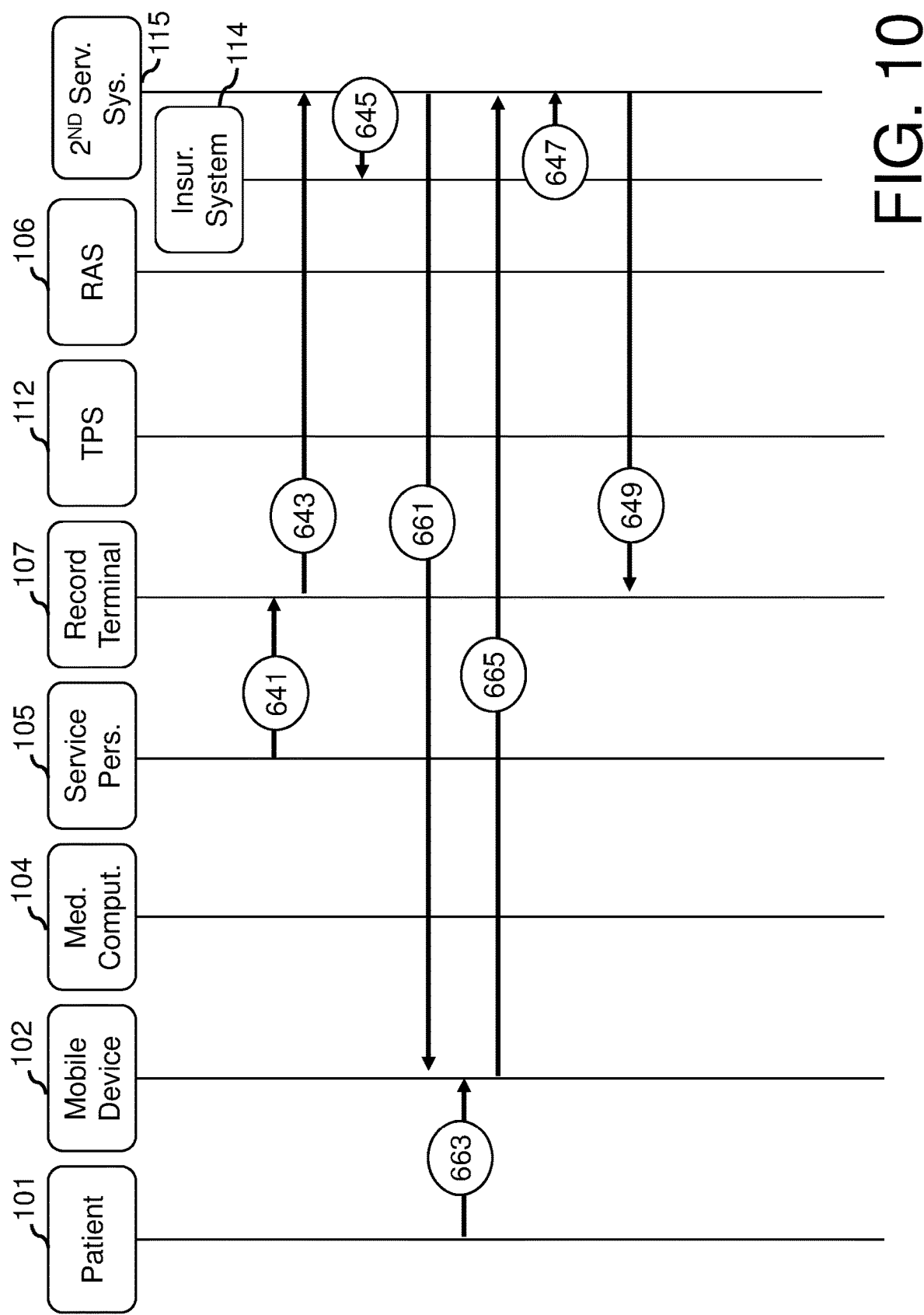
FIG. 10 is a process diagram illustrating a non-limiting embodiment of a method for patient authentication and identity risk assessment according to the principles of the present disclosure.

With reference to FIG. 10, and in non-limiting embodiments or aspects, provided is a process diagram illustrating a method of patient authentication and identity risk assessment. FIG. 10 illustrates a method including a record sharing framework that includes a prompt for patient 101 approval, in comparison to FIG. 9. Steps of the depicted method may be performed by one or more of a mobile device 102, a medical provider computing device 104, a record terminal 107, which may be associated with and/or included in a medical provider computing device 104, a transaction processing system 112, a risk assessment system 106, which may be associated with and/or included in a transaction processing system 112, an insurance provider system 114, and a second service provider system 115. It will be appreciated that the described actions of the patient 101 may also be executed by a user operating the mobile device 102 on behalf of the patient 101. The illustrated method of FIG. 10 provides the benefit of improved system security and reduced network communications, by reducing unauthorized electronic record transfers and preventing the triggering of electronic insurance processes due to fraudulent insurance requests, particularly by leveraging a patient insurance token and a step-up authentication process with the mobile device 102.

Steps 641, 643, and 645 may be executed as described above with respect to FIG. 9. For example, the service personnel 105 may input the request for patient records into the record terminal 107, in step 641. The record terminal 107 may communicate the records request to the second service provider system 115, in step 643. The second service provider system 115, prior to sending patient records back to the record terminal 107, may communicate the patient insurance token to the insurance provider system 114. The insurance provider system's 114 review of the patient insurance token may be before, during, or after steps 661, 663, and 665, where the second service provider system 115 requests authorization for record sharing from the patient 101.

In step 661, an access request may be communicated to the mobile device 102 of the patient 101. The access request may be a message configured to prompt the patient 101 for approval of record sharing. For example, the second service provider system 115 may generate and communicate the access request to the mobile device 102, such as in the form of a push message via a mobile application. The access request may be a notification displayed on the mobile device 102, such as "Dr. Anderson is requesting access to your knee x-ray from 04-01-2015. Swipe to confirm." In response to the message, the patient 101 may confirm or deny the access.

In response to receiving the access request, in step 663, the patient 101 may approve or decline the access request via input to the mobile device 102. If the patient 101 does not approve the access request, the mobile device 102 may communicate a decline message to the second service provider system 115, in step 665. If the patient 101 approves the access request, the mobile device 102 may communicate an approval message to the second service provider system 115.

In response to the patient 101 approving the access request and the mobile device 102 communicating an approval message to the second service provider system 115, steps 647 and 649 may be executed as described with respect to FIG. 9. For example, if the patient insurance token is determined to be valid and corresponds to the patient 101 for which records are being requested, the insurance service provider system 114 may communicate a response to the second service provider system 115 indicating that record sharing is approved, in step 647. The second service provider system 115 may communicate patient records stored at the second service provider system 115, in association with the patient 101, to the record terminal 107, in step 649.

With further reference to the foregoing figures, and in non-limiting embodiments or aspects, a patient 101 may enroll (e.g., configure their identity and participation) in the described patient identification and authentication system. Enrollment may be executed in an in-person process or online process.

An in-person enrollment process may include a patient 101 presenting a form of identification (e.g., a driver's license) to an agent, who may use a computing device to submit a proof of identity to the transaction processing system 112 for the patient 101 based on the form of identification. The computing device may be configured with an enrollment application. The agent may link, using the application, the patient's 101 payment device (e.g., a credit card) with a patient identifier so that the payment device may be used as a means of identification for the patient 101. Alternatively or additionally, the application may trigger a one-time code to be generated so that the patient 101 may configure an application on their mobile device 102 for use in the foregoing systems. The mobile device 102 may prompt the patient 101 to set up the mobile device 102 for Fast Identification Online (FIDO) authentication protocols, in which biometric data for the patient may be uploaded to a database for access by the transaction processing system 112 and/or insurance provider system 114, for later use in patient authentication.

An online enrollment process may include a patient 101 using a computing device (e.g., the mobile device 102) to submit a form of identification (e.g., an image of a driver's license) as a proof of identity to the transaction processing system 112. Thereafter, the transaction processing system 112 may prompt the computing device of the patient 101 to configure a payment device for association with a payment identifier and/or configure an application of a mobile device 102 for use in the foregoing systems. The transaction processing system 112 may also prompt the patient 101 to set up the mobile device 102 for FIDO authentication protocols, described above.

Although the present disclosure has been described in detail for the purpose of illustration based on what is currently considered to be the most practical and preferred embodiments, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method comprising:
   receiving, with at least one processor, an initial patient authorization request from a medical provider computing device, the initial patient authorization request comprising a patient identifier communicated by a mobile device of a user to the medical provider computing device;
   generating, with at least one processor using an identification risk assessment model and based at least partly on the initial patient authorization request, an authenticity score;
   communicating, with at least one processor, the authenticity score to an insurance provider system to cause the insurance provider system to approve or decline the initial patient authorization request;
   receiving, with at least one processor, a primary insurance provider response from the insurance provider system comprising a prompt for the mobile device to initiate a patient identification response to prove a patient identity;
   communicating, with at least one processor, at least a portion of the primary insurance provider response to the medical provider computing device;
   receiving, with at least one processor, the patient identification response from the mobile device, the patient identification response comprising the patient identifier and at least one proof of the patient identity;
   in response to validating the at least one proof, communicating, with at least one processor, an identification evaluation response to the mobile device, the identification evaluation response comprising a validation token;
   receiving, with at least one processor, a secondary patient authorization request from the medical provider computing device via an electronic payment processing network, the secondary patient authorization request comprising the patient identifier and the validation token; and
   communicating, with at least one processor, at least a portion of a secondary insurance provider response to the medical provider computing device, the secondary insurance provider response based on a new authenticity score based at least partly on the secondary patient authorization request.

2. The computer-implemented method of claim 1, wherein the primary insurance provider response comprises a final authorization of insurance for a patient associated with the patient identifier.

3. The computer-implemented method of claim 1, wherein the at least one proof comprises at least one of the following: biometric data captured by the mobile device; a patient identity token stored on the mobile device; patient credentials input by the user on the mobile device; or any combination thereof.

4. The computer-implemented method of claim 3, further comprising, in response to the at least one proof comprising an invalid proof:
   communicating, with at least one processor, an identification evaluation response to the mobile device comprising a failure message; and
   initiating, with at least one processor, at least one insurance security action comprising at least one of the following: freezing an insurance account associated with the patient identifier; communicating an alert to a registered computing device associated with the patient identifier; communicating an alert to the medical provider computing device; or any combination thereof.

5. The computer-implemented method of claim 1, further comprising:
   generating, with at least one processor using the identification risk assessment model and based at least partly on the secondary patient authorization request, the new authenticity score;
   communicating, with at least one processor, the new authenticity score to the insurance provider system to cause the insurance provider system to approve or decline the secondary patient authorization request; and
   receiving, with at least one processor, the secondary insurance provider response from the insurance provider system.

6. The computer-implemented method of claim 5, wherein the secondary insurance provider response comprises a final authorization of insurance for a patient associated with the patient identifier.

7. A system comprising a server comprising at least one processor, the server being programmed and/or configured to:
- receive an initial patient authorization request from a medical provider computing device, the initial patient authorization request comprising a patient identifier communicated by a mobile device of a user to the medical provider computing device;
- generate, using an identification risk assessment model and based at least partly on the initial patient authorization request, an authenticity score;
- communicate the authenticity score to an insurance provider system to cause the insurance provider system to approve or decline the initial patient authorization request;
- receive a primary insurance provider response from the insurance provider system comprising a prompt for the mobile device to initiate a patient identification response to prove a patient identity;
- communicate at least a portion of the primary insurance provider response to the medical provider computing device;
- receive the patient identification response from the mobile device, the patient identification response comprising the patient identifier and at least one proof of the patient identity;
- in response to validating the at least one proof, communicate an identification evaluation response to the mobile device, the identification evaluation response comprising a validation token;
- receive a secondary patient authorization request from the medical provider computing device via an electronic payment processing network, the secondary patient authorization request comprising the patient identifier and the validation token; and
- communicate at least a portion of a secondary insurance provider response to the medical provider computing device, the secondary insurance provider response based on a new authenticity score based at least partly on the secondary patient authorization request.

8. The system of claim 7, wherein the at least one proof comprises at least one of the following: biometric data captured by the mobile device; a patient identity token stored on the mobile device; patient credentials input by the user on the mobile device; or any combination thereof.

9. The system of claim 8, wherein the server is further programmed and/or configured to, in response to the at least one proof comprising an invalid proof:
- communicate an identification evaluation response to the mobile device comprising a failure message; and
- initiate at least one insurance security action comprising at least one of the following: freezing an insurance account associated with the patient identifier; communicating an alert to a registered computing device associated with the patient identifier; communicating an alert to the medical provider computing device; or any combination thereof.

10. The system of claim 7, wherein the server is further programmed and/or configured to:
- generate, using the identification risk assessment model and based at least partly on the secondary patient authorization request, the new authenticity score;
- communicate the new authenticity score to the insurance provider system to cause the insurance provider system to approve or decline the secondary patient authorization request; and
- receive the secondary insurance provider response from the insurance provider system.

11. The system of claim 10, wherein the secondary insurance provider response comprises a final authorization of insurance for a patient associated with the patient identifier.

12. A computer program product comprising at least one non-transitory computer-readable medium including program instructions that, when executed by at least one processor, cause the at least one processor to:
- receive an initial patient authorization request from a medical provider computing device, the initial patient authorization request comprising a patient identifier communicated by a mobile device of a user to the medical provider computing device;
- generate, using an identification risk assessment model and based at least partly on the initial patient authorization request, an authenticity score;
- communicate the authenticity score to an insurance provider system to cause the insurance provider system to approve or decline the initial patient authorization request;
- receive a primary insurance provider response from the insurance provider system comprising a prompt for the mobile device to initiate a patient identification response to prove a patient identity;
- communicate at least a portion of the primary insurance provider response to the medical provider computing device;
- receive the patient identification response from the mobile device, the patient identification response comprising the patient identifier and at least one proof of the patient identity;
- in response to validating the at least one proof, communicate an identification evaluation response to the mobile device, the identification evaluation response comprising a validation token;
- receive a secondary patient authorization request from the medical provider computing device via an electronic payment processing network, the secondary patient authorization request comprising the patient identifier and the validation token; and
- communicate at least a portion of a secondary insurance provider response to the medical provider computing device, the secondary insurance provider response based on a new authenticity score based at least partly on the secondary patient authorization request.

13. The computer program product of claim 12, wherein the at least one proof comprises at least one of the following: biometric data captured by the mobile device; a patient identity token stored on the mobile device; patient credentials input by the user on the mobile device; or any combination thereof.

14. The computer program product of claim 13, wherein the program instructions further cause the at least one processor to, in response to the at least one proof comprising an invalid proof:
- communicate an identification evaluation response to the mobile device comprising a failure message; and
- initiate at least one insurance security action comprising at least one of the following: freezing an insurance account associated with the patient identifier; communicating an alert to a registered computing device associated with the patient identifier; communicating an alert to the medical provider computing device; or any combination thereof.

15. The computer program product of claim 12, wherein the program instructions further cause the at least one processor to:
generate, using the identification risk assessment model and based at least partly on the secondary patient authorization request, the new authenticity score;
communicate the new authenticity score to the insurance provider system to cause the insurance provider system to approve or decline the secondary patient authorization request; and
receive the secondary insurance provider response from the insurance provider system.

16. The computer program product of claim 15, wherein the secondary insurance provider response comprises a final authorization of insurance for a patient associated with the patient identifier.

* * * * *